(12) United States Patent
Delorme et al.

(10) Patent No.: US 8,879,491 B2
(45) Date of Patent: Nov. 4, 2014

(54) WIRELESS TERMINAL FOR TRANSMITTING PACKETS OF DIFFERENT TYPES

(75) Inventors: Flavien Delorme, Vence (FR); Bruno De Smet, Terra Nostra (FR)

(73) Assignee: Nvidia Corporation, Santa Clara, CA (US)

( * ) Notice: Subject to any disclaimer, the term of this patent is extended or adjusted under 35 U.S.C. 154(b) by 147 days.

(21) Appl. No.: 13/510,809

(22) PCT Filed: Oct. 6, 2010

(86) PCT No.: PCT/EP2010/064942
§ 371 (c)(1),
(2), (4) Date: Jul. 11, 2012

(87) PCT Pub. No.: WO2011/061003
PCT Pub. Date: May 26, 2011

(65) Prior Publication Data
US 2012/0269150 A1    Oct. 25, 2012

(30) Foreign Application Priority Data
Nov. 19, 2009 (GB) .................................. 0920261.5

(51) Int. Cl.
| H04W 4/00 | (2009.01) |
| H04L 29/06 | (2006.01) |
| H04L 12/863 | (2013.01) |
| H04L 12/865 | (2013.01) |
| H04L 12/801 | (2013.01) |
| H04L 12/841 | (2013.01) |
| H04L 12/823 | (2013.01) |

(52) U.S. Cl.
CPC ............ *H04L 69/16* (2013.01); *H04L 47/6215* (2013.01); *H04L 47/6275* (2013.01); *H04L 69/22* (2013.01); *H04L 69/161* (2013.01); *H04L 69/163* (2013.01); *H04L 47/193* (2013.01); *H04L 47/28* (2013.01); *H04L 47/32* (2013.01)
USPC ........................................................ 370/329

(58) Field of Classification Search
CPC . H04W 72/10; H04W 72/12; H04W 72/1242; H04W 80/06
See application file for complete search history.

(56) References Cited

U.S. PATENT DOCUMENTS

| 6,292,491 B1 * | 9/2001 | Sharper ......................... 370/412 |
| 2002/0093984 A1 * | 7/2002 | Venters et al. ................ 370/468 |

(Continued)

FOREIGN PATENT DOCUMENTS

| GB | 0920261.5 | 10/2010 |
| WO | 2007022441 A1 | 2/2007 |
| WO | 2011061003 A1 | 5/2011 |

OTHER PUBLICATIONS

Polyzos, George C., et al., "Enhancing Wireless Internet Links for Multimedia Services", Proceedings of the MOMUC 1998,(XP-002273077) pp. 379-384.

(Continued)

*Primary Examiner* — Otis L Thompson, Jr.

(57) ABSTRACT

A terminal comprising: a radio-frequency transmitter for transmitting packets on an uplink to a wireless cellular network; and processing apparatus comprising an upper protocol stack and a lower protocol stack, the upper stack being arranged to process data according to one or more transport protocols and form the data into packets of a plurality of different types for transmission over a packet-based network, and the lower stack being arranged to receive the packets from the upper stack and process them for transmission via the wireless cellular network. The lower stack comprises a plurality of packet queues each corresponding to a different respective priority level, and a packet decoder configured to supply each packet in dependence on its type to a packet queue of a corresponding priority level. The lower stack further comprises a dequeuing mechanism configured to dequeue packets for transmission from said queues in dependence on the priority levels.

20 Claims, 11 Drawing Sheets

(56) References Cited

U.S. PATENT DOCUMENTS

| | | |
|---|---|---|
| 2002/0126675 A1 | 9/2002 | Yoshimura et al. |
| 2004/0001493 A1* | 1/2004 | Cloonan et al. .......... 370/395.42 |
| 2006/0018277 A1* | 1/2006 | Petrovic et al. ............... 370/329 |
| 2006/0268871 A1* | 11/2006 | Van Zijst ...................... 370/390 |
| 2007/0036116 A1* | 2/2007 | Eiger et al. ................... 370/338 |
| 2008/0080464 A1* | 4/2008 | Speight ........................ 370/342 |
| 2009/0298575 A1* | 12/2009 | Hopkins et al. ................. 463/25 |
| 2011/0026503 A1* | 2/2011 | Mueck et al. ................. 370/338 |

OTHER PUBLICATIONS

Kawakami, Hiroshi, et al., "Moving Network Support and QoS Control for UMTS Networks", Electronics and Communications in Japan, Part 1, vol. 88, No. 5, 2005, pp. 28-38.

Swami, Yogesh, et al., "Cross-Layer Optimization of Transport Protocols over Wireless Networks", 2008 IEEE, pp. 241-245.

* cited by examiner

RTP vs TCP without priority mechanism

TCP vs TCP without priority mechanism

FIG. 4d

TCP vs TCP with priority mechanism

WIRELESS TERMINAL FOR TRANSMITTING PACKETS OF DIFFERENT TYPES

CROSS-REFERENCE TO RELATED APPLICATION

This application is the National Stage of, and therefore claims the benefit of, International Application No. PCT/EP2010/064942 filed on Oct. 6, 2010, entitled "WIRELESS TERMINAL FOR TRANSMITTING PACKETS OF DIFFERENT TYPES," which was published in English under International Publication Number WO 2011/061003 on May 26, 2011, and has a priority date of Nov. 19, 2009, based on application GB 0920261.5. Both of the above applications are commonly assigned with this National Stage application and are incorporated herein by reference in their entirety.

FIELD OF THE INVENTION

The present invention relates to protocols for transmitting packets of data over a network such as a wireless cellular network.

BACKGROUND

Figure 1A:
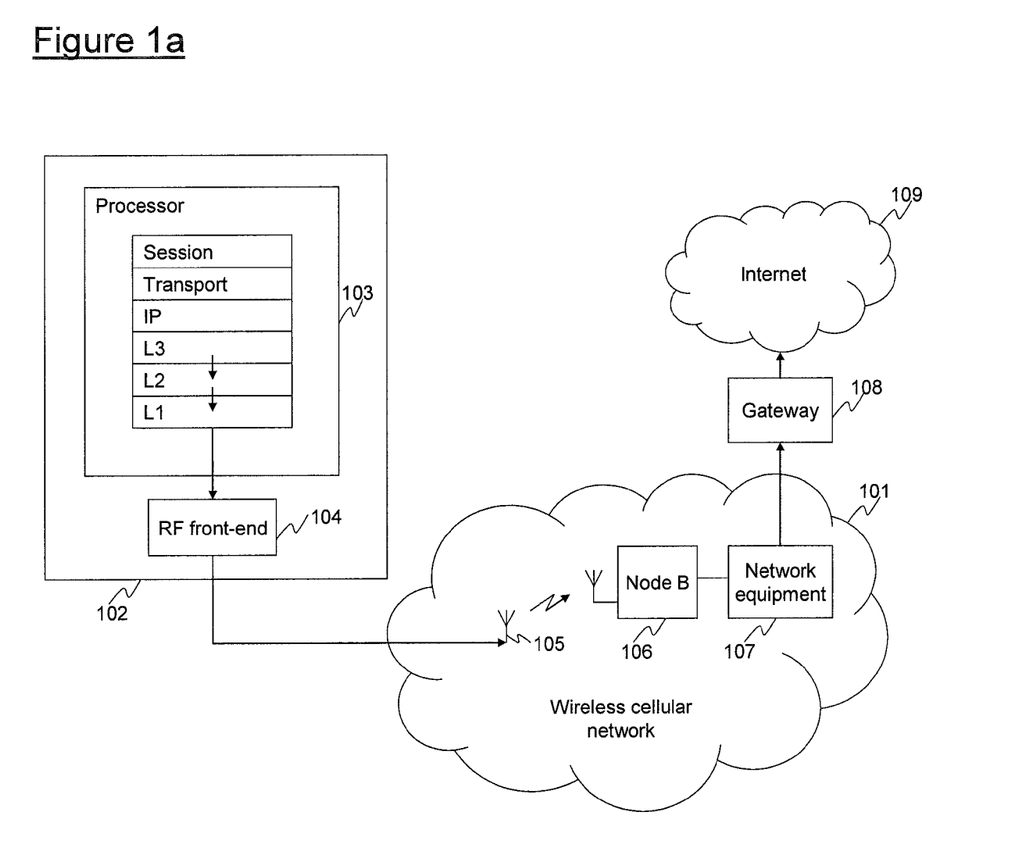
FIG. 1a is a schematic block diagram of a communication system comprising a wireless cellular network and a packet-based network such as the Internet.

FIG. 1a is a high-level schematic block diagram showing a wireless transmitter 102 comprising a processor 103, a radio frequency (RF) front-end 104 coupled to the processor 103, and an antenna 105 coupled to the RF front-end 104. The transmitter 102 is arranged by means of these components to communicate wirelessly over an air interface with a base station 106 (node B in 3GPP terminology) of a wireless cellular network 101. The node B 106 is coupled via various upstream equipment 107 of the wireless cellular network 101 to a gateway 108, which in turn couples to another, packet-based network 109 such as the Internet.

There are a number of different ways to model a protocol stack for communicating over one or more networks. As shown schematically in FIG. 1a for instance, in the GSM model the protocol stack for communicating over a wireless cellular network 101 may be modelled broadly as comprising three basic layers, termed Layer 1 (L1), Layer 2 (L2) and Layer 3 (L3).

At the lowest hierarchical level is Layer 1 (or L1), which is the physical layer. The physical layer is the mechanism that handles the transmission and reception of data on the level of individual bits; or more generally, individual elementary symbols, e.g. in the case of quadrature or higher phase-shift keying. The physical layer is concerned with how to actually place a bit or symbol onto a transmission medium (in this case the air interface) and how to receive a bit or symbol from that medium. That is, the physical layer performs signal processing related to the physical properties of the transmission medium. For example, the physical layer may include equalisation or rake processing of received signals, at least part of the modulation and demodulation of the transmitted and received signals respectively, and/or spreading and despreading for code division multiple access (CDMA) communications.

The next hierarchical level is Layer 2 (or L2), which is the data link layer. This involves protocols for establishing and maintaining a wireless connection between transmitting and receiving nodes of the wireless cellular network, and the communication of meaningful data therebetween; e.g. formatting data into frames for wireless transmission and acknowledging receipt of data over the wireless connection. Notably, Layer 2 is concerned with end-to-end connection between two (or more) nodes of the wireless cellular network, whereas Layer 1 is only concerned with the immediate interface between the terminal and the physical transmission medium. Further, Layer 2 is concerned with the transmission and reception of meaningful data, whereas at Layer 1 the individual bits or symbols in themselves have no immediate meaning.

At the highest hierarchical level of the GSM/3GPP model, Layer 3 (or L3) provides higher level network management functions. These include mobility management, e.g. handover, paging, registration (i.e. functions relating to movement between cells). Layer 3 functions also include resource management, e.g. power control and other functions relating to allocation of resources. The Layer 3 functions further include call management.

Preferably, at least the Layers L2 and L3 are implemented in software running on the transmitter's processor 103. Using a soft modem and associated chipset produced by Icera Inc and sold under the trade name Livanto™, a substantial part of the physical layer L1 may advantageously also be implemented in software running on the processor 103. Alternatively however, more of the physical layer functionality may be implemented in dedicated hardware.

Note that the RF front-end 104 may actually be considered as being part of L1 —this is just a matter of how the stack is modelled. However, by way of a schematic example in the following, a substantially soft physical layer is assumed and for illustrative purposes the soft part of L1 is shown separately from the RF hardware front-end 104.

On top of the wireless layers L1 to L3 for handling access to the wireless cellular network 101 itself, there may be stacked additional layers for providing access to a packet-based network 109 such as the Internet via the wireless cellular network 101 and gateway 108. These include a session layer, a transport layer, and a network layer for the packet-based network 109 such as the IP layer.

Each layer is preferably implemented as a software module, and the layers may be modelled as being arranged in the form of a stack because each layer is arranged to communicate with two "adjacent" other layers. In this sense, the session layer is arranged between one or more user applications and the transport layer, the transport layer is arranged between the session layer and the IP layer, the IP layer is arranged between the transport layer and Layer 3 (L3), Layer 3 is arranged between the transport layer and Layer 2 (L2), Layer 2 is arranged between Layer 3 and Layer 1 (L1), and Layer 1 is arranged between Layer 2 and the wireless cellular network 101 via the RF front-end 104.

Figure 1B:
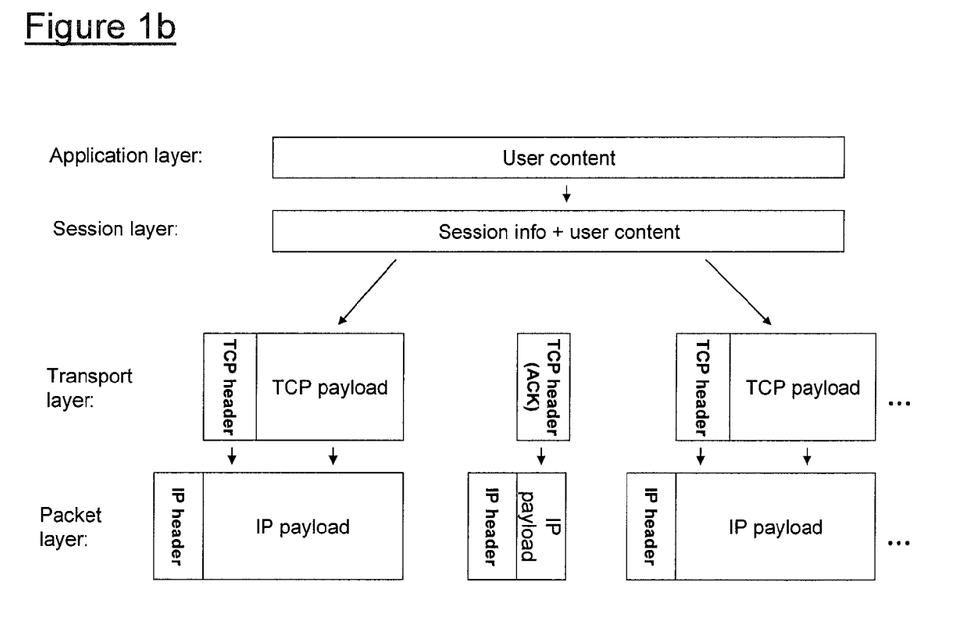
FIG. 1b is a schematic representation of a transport protocol and IP protocol.

Referring to FIG. 1b, in operation the session layer receives user content (e.g. a media stream, file transfer, etc.) from a user application. The session layer is responsible for setting up and controlling the Internet session, or "context". The session layer negotiates with the gateway 108 in order to set up the context, including exchanging information describing the session such as an identifier of the user, the user's IMSI (Internet Mobile Subscriber Identity), and information about the Internet gateway 108 to be used. The context may be for example a Packet Data Protocol (PDP) context or Evolved Packet System (EPS) bearer context.

The session layer supplies portions of the session information and user content to the transport layer. As will be familiar to a person skilled in the art, transport protocols include for example Transmission Control Protocol (TCP), Real-time Transport Protocol (RTP), and User Datagram protocol (UDP).

The TCP protocol involves an initial handshaking phase to establish a connection or "vertical circuit" between Internet end-points (this Internet connection being conceptually distinct from the wireless connection handled by Layer 2, being at a higher level of abstraction than the wireless connection but a lower level of abstraction than the session). There then follows a data transmission phase, then a connection termination phase to break the TCP connection.

During the data transmission phase, the session information and user content received from the session layer are placed into the payloads of a plurality of discrete TCP segments (the transport layer is not aware of the meaning of the session information or user content within the payloads). Each segment comprises a respective payload and also a respective TCP header added by the transport layer.

Each segment can carry both payload data in the payload and control information in the header. For example, an ACK flag can be set in the header of a TCP segment, in which case the same TCP segment can be used both to send a portion of data and acknowledge receipt of another previously received portion of data (identified by an acknowledgement number in the header). E.g. each of TCP the first and third segments in FIG. 2 could be either a pure data segment or a data segment with ACK. As another example, an URG flag can be set in the TCP header to indicate that the segment is urgent. Some segments may contain no payload, e.g. it is also possible for the TCP layer to generate a pure ACK segment comprising only an ACK header and no payload, as shown in the second TCP segment in FIG. 2. As will be familiar to a person skilled in the art, other flags that can be set in the header are CWR, ECE, PSH, RST, SYN and FIN. The TCP header can also add, for example, a packet number for re-ordering of out-of-order packets received at the recipient end, error correction codes, and a source and destination port number.

UDP is an alternative transport protocols, without the same degree of error detection and without end-to-end acknowledgement or handshaking, making it more suitable for use in applications where on-time delivery is more important that error rate or packet loss rate. RTP is a transport protocol specially designed for streaming audio and video media.

The TCP segments (or the units of another transport protocol such as RTP or UDP) are next passed from the transport layer to the IP layer, which adds a respective IP header to each segment in order to form a respective IP packet. That is, each IP packet comprises an IP header and an IP payload, the payload comprising the TCP segment. Amongst other information, the IP address contains a source and destination IP address for use in communicating the packet over the Internet 109.

IP layer does not see inside the IP payload, so does not see the TCP header or session information as being any different from the rest of the user content data. That is, the IP layer is not aware of the meaning of the user content, session information or TCP headers within the IP packet payloads.

The IP packets are then transferred through Layers L3 to L1, onto the wireless cellular network 101 via the RF front-end 104 and over the Internet 109 via the node B 106, network equipment 107 and gateway 108.

Note that there may be different ways of modelling a protocol stack. For example, the above describes a TCP/IP type model (an upper stack) stacked on top of a 3GPP/GSM type model (a lower stack), but the layers of the GSM/3GPP and TCP/IP models may not map directly to the layers of the OSI model. The exact manner in which the layers are divided or described in any given model is not important, but the underlying idea is that data is passed down through hierarchical layers for transmission, from higher levels of abstraction dealing with meaningful information, through layers dealing with network functions, transport protocols and packetisation, then down to a physical layer which transmits individual elementary symbols on the transmission medium.

In 3GPP the stack is sometimes alternatively modelled in terms of an "Access Stratum" comprising L1 and L2, and a "Non Access Stratum" comprising L3 plus higher layers.

SUMMARY

The inventors have identified a problem in that 3GPP does not define any priority mechanism for data transmitted over the same PDP context (2G/3G) or EPS bearer context (LTE).

Different applications using different transport protocols (RTP, TCP, or UDP, etc.) may use the same PDP context or the same EPS bearer context, or other such session context. For example, a VoIP call may use RTP or UDP transport protocol whilst a file transfer uses TCP transport protocol, but both using the same context through the same 3GPP modem.

However, depending on the transport protocol of any given packet, the transmission delay may have a high or low impact on performance and quality of service.

More generally, this problem can occur in any situation where packets of different types have a different sensitivity to or tolerance of delay.

According to one aspect of the present invention, there is provided a terminal comprising: a radio-frequency transmitter for transmitting packets on an uplink to a wireless cellular network; and processing apparatus comprising an upper protocol stack and a lower protocol stack coupled between the upper stack and the radio-frequency transmitter, the upper stack being arranged to process data according to one or more transport protocols and form the data into packets of a plurality of different types for transmission over a packet-based network, and the lower stack being arranged to receive said packets from the upper stack and process the packets for transmission via the wireless cellular network; wherein the lower stack comprises a plurality of packet queues each corresponding to a different respective priority level, and a packet decoder configured to decode a portion of each packet to determine its type and supply each packet in dependence on its type to a packet queue of a corresponding priority level; and wherein the lower stack further comprises a dequeuing mechanism configured to dequeue packets from said queues in dependence on the priority levels for transmission from the radio-frequency transmitter via the wireless cellular network to the packet-based network.

Unusually therefore, the packet decoder decodes information from further up the protocol stack, even though such information would more conventionally be opaque to the lower portions of the stack which deal with the protocols of the wireless cellular network. That is, this information would more conventionally appear to the lower stack as being no different than any other payload information.

The present invention thus advantageously allows a priority mechanism to be implemented in the layers responsible for transmitting over the wireless cellular network, but based on the type of protocol used in the higher layers responsible for communicating over the packet-based network such as the Internet.

In preferred embodiments, the dequeuing mechanism may be configured, after a specified time period, to dequeue one or more oldest packets regardless of priority level.

The dequeuing mechanism may be configured to periodically dequeue one or more oldest packets regardless of priority level.

The dequeuing mechanism may be configured to periodically dequeue the oldest packet from each of a plurality of said queues regardless of priority level.

The dequeuing mechanism may be configured to dequeue the one or more oldest packets with a period that is dynamically variable.

The dequeuing mechanism may be configured to dequeue the one or more oldest packets with a period determined in dependence on one or both of: an average packet size, and a transmission bandwidth available for transmission.

These embodiments advantageously avoid a problem that could otherwise occur whereby lower-priority packets could become blocked indefinitely by higher priority packets.

In yet further embodiments, the upper stack may be arranged to process data according to a plurality of different transport protocols, said different types corresponding to the different transport protocols.

Said different transport protocols may include at least one or more of TCP, RTP and UDP.

The packet decoder may be configured to supply RTP packets to a higher priority queue than TCP packets.

Said different types may correspond to whether or not the packet comprises an acknowledgement message of the transport protocol.

The packet decoder may be configured to supply TCP ACK packets to a higher priority queue than TCP data packets.

These embodiments advantageously take into account the fact that different transport protocols and/or different messages within a transport protocol have different purposes, and therefore depending on the transport protocol or the function of the packet within the transport protocol then the transmission delay will have a higher or lower impact on performance and quality of service. For example, RTP packets are typically used for live media streams, and therefore may be more sensitive to on-time delivery than TCP packets. As another example, TCP acknowledgment packets (ACK) may cause delay in transmitting or receiving further data if not delivered on time, and therefore may benefit from a higher priority than TCP data packets that do not indicate an ACK.

In yet further embodiments, the packet decoder may be configured to determine the type of each packet by reading a header of the transport protocol in each packet.

The lower stack may be arranged to transmit in a plurality of transmission time intervals, and its dequeuing mechanism may be configured to dequeue only a minimum amount of data per transmission time interval, the minimum amount corresponding to a bandwidth available for transmission in that time interval.

The upper stack may comprise a transport layer arranged to process the data according to the one or more transport protocols, and an IP layer configured to form portions of the data from the transport layer into IP packets for transmission over the packet-based network.

The upper stack may comprise at least one further layer above the transport layer configured to control a session of the packet-based network.

Said packets of different types may be transmitted using a same session context.

The packet-based network may comprise the Internet.

The lower stack may comprise at least 3GPP Layer 2 and Layer 1.

Said plurality of packet queues and the dequeuing mechanism may each be implemented in Layer 2, the dequeuing mechanism being configured to dequeue the packets from said queues to Layer 1 for transmission from the radio-frequency transmitter via the wireless cellular network to the packet-based network.

The header decoder may be implemented in Layer 2.

The wireless cellular network may comprise a 3GPP network.

According to another aspect of the present invention, there is provided a method comprising: in an upper protocol stack, processing data according to one or more transport protocols and forming the data into packets of a plurality of different types for transmission over a packet-based network; in a lower protocol stack, receiving said packets from the upper stack and processing the packets for transmission via a wireless cellular network; operating a radio-frequency transmitter to transmit said packets on an uplink to the wireless cellular network; wherein the method further comprises, in the lower stack, decoding a portion of each of said packets to determine its type, and supplying each packet in dependence on its type to a packet queue of a corresponding priority level; and dequeuing packets from said queues in dependence on the priority levels, for transmission from the radio-frequency transmitter via the wireless cellular network to the packet-based network.

In embodiments, the method may further comprise steps in accordance with any of the above terminal features.

According to another aspect of the present invention, there is provided a lower protocol stack program product for use in conjunction with an upper protocol stack; the upper protocol stack being for processing data according to one or more transport protocols and forming the data into packets of a plurality of different types for transmission over a packet-based network; and the lower protocol stack program product comprising code embodied on a computer readable medium and being configured so as when executed on a processor to: receive said packets from the upper stack, and process the packets for transmission via a wireless cellular network; decode a portion of each of said packets to determine its type, and supply each packet in dependence on its type to a packet queue of a corresponding priority level; dequeue packets from said queues in dependence on the priority levels, for transmission from the radio-frequency transmitter via the wireless cellular network to the packet-based network; and operate a radio-frequency transmitter to transmit the dequeued packets on an uplink to the wireless cellular network.

In embodiments, the program product may be further configured in accordance with any of the above terminal or method features.

BRIEF DESCRIPTION OF THE DRAWINGS

For a better understanding of the present invention and to show how it may be put into effect, reference is made to the accompanying drawings in which.

DETAILED DESCRIPTION OF PREFERRED EMBODIMENTS

In a preferred application, the present invention adds an uplink dataflow priority mechanism to the up-plane interface between the Non Access Stratum (L3) and the Access Stratum (L2) in 3GPP systems, including 2G, 3G and Long Term Evolution (LTE) systems. The purpose is to be able to prioritise packets conveyed on one Data Radio Bearer before being provided to the Access Stratum.

The priority mechanism provides a method to reduce the transmission time of the packets for which this transmission time is critical. This method reduces the time while such a packet is buffered higher up the protocol stack before being transmitted to the radio interface (physical layer L1 and RF front-end 104).

Figure 2:
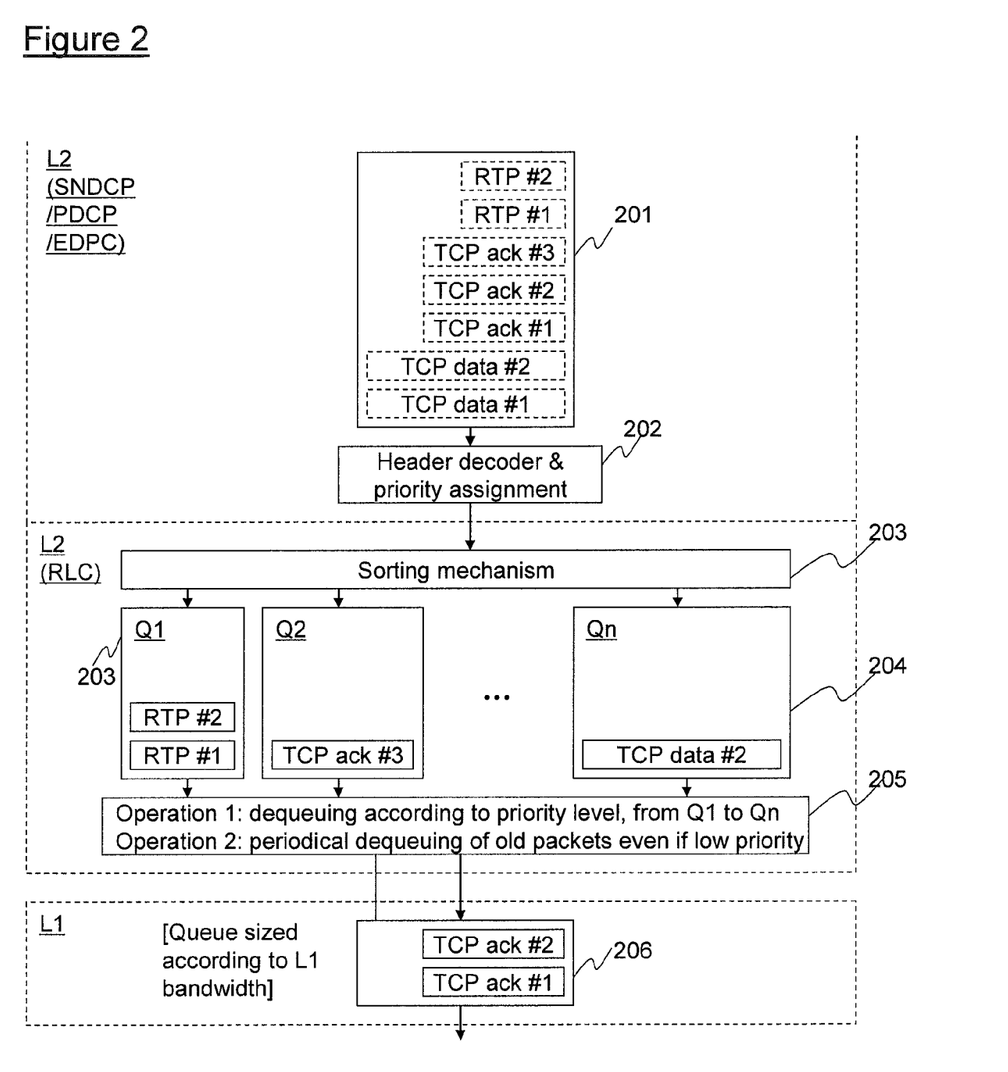
FIG. 2 is a schematic block diagram of a priority mechanism implemented in a protocol stack.

FIG. 2 is a schematic block diagram showing relevant parts of Layer 2 and Layer 1 according to a preferred embodiment of the present invention.

Layer 2 may in fact be considered to comprise two sub-layers: a lower sub-layer referred to as the RLC (Radio Link Control) layer; and an upper sub-layer or "layer 2.5" referred to as the SNDCP (Sub Network Dependent Convergence Protocol) for 2G communications, the PDCP (Packet Data Convergence Protocol) for 3G communications, and the EPDCP (Evolved Packet Data Convergence Protocol) for LTE communications.

According to a preferred embodiment of the present invention, the SNDCP/PDCP/EPDCP sub-layer of L2 comprises: an initial packet queue 201 arranged to receive packets form the IP layer above, and a header decoder 202 coupled to the initial packet queue 201. The RLC sub-layer of Layer 2 comprises: a sorting mechanism 203 coupled to the output of the initial packet queue 201 via the header decoder 202, a plurality of parallel sorting packet queues 204 (Q1 . . . Qn) each having an input coupled to an output of the sorting mechanism 203, and a dequeuing mechanism 205 coupled to the output of each of the sorting queues 204. Layer 1 (L1) comprises a transmission packet queue 206 having an input coupled to an output of the dequeuing mechanism 205 in the RLC sub-layer of L2, and having an output coupled to the RF front-end 104 for transmitting packets over the air interface via the wireless cellular network 101 (and virtue of the protocols added by the IP, transport and session layers, the packets will be ultimately destined for transmission over the Internet 101). Each of the queues 201, 204 and 206 is preferably a first-in-first-our buffer (FIFO), but other types of queue are not necessarily excluded. The transmission buffer 206 may also have a control link to the dequeuing mechanism 205 for signalling a ready status when it has space to accept more packets.

In operation, the header decoder 202 in L2 reads the transport protocol header inside the payload of each IP packet received from the IP layer. Unusually therefore, note that the header decoder 202 in L2 actually decodes transport protocol information from further up the protocol stack. More conventionally, lower down the stack from the IP layer downwards, the contents of the IP packets' payloads are meaningless to those lower layers and the lower layers such as L2 or L3 do not see the transport protocol as being any different from the session information or user content that is also contained within the IP packet payloads. The packet decoder 202 on the other hand decodes transport protocol header from within what is the packet's payload from perspective of the layers below the transport protocol. This advantageously allows a priority mechanism to be implemented in the layers responsible for transmitting over the wireless cellular network, but based on the type of protocol used in the higher layers responsible for communicating over the packet-based network 109 such as the Internet.

The header decoder 202 then sets a priority level for each packet according to its type. For example, the following considerations may be taken into account.

RTP packets need to be delivered as soon as possible. Any delayed packet is ignored by the receiver and then the audio quality is reduced.

TCP acknowledgement packets need to be delivered as soon as possible also. Their reception will allow the receiver to transmit new TCP data packets. If the TCP acknowledgement packets are delayed then a TCP timer will expire and the TCP transmission window of the receiver will be reduced and the global throughput will decrease.

TCP data packets can be delayed by the time smaller packets (e.g. RTP or TCP ack) are transmitted without significant impact.

Thus for example, RTP packets may be assigned a highest priority level, TCP acknowledgement packets may be assigned an intermediate priority level, and TCP data packets may be assigned a lower priority level. Other types of TCP packet such as URG, CWR, ECE, PSH, RST, SYN and/or FIN could also be allocated different priority levels. Further, different priority levels may be assigned to other types of transport protocol such as UDP.

The SNDCP/PDCP/EPDCP sub-layer of L2 forwards the packets from the initial queue 201 along with their priority levels from the header decoder 202 to the priority sorting mechanism 203 in the RLC sub-layer of L2.

The sorting mechanism 203 supplies the packets to different sorting queues 204 (Q1 . . . Qn) in dependent on their priority level. There is one sorting queue 204 per priority level. When L1 can transmit data again, e.g. because it has space in its transmission buffer 206, it sends a ready signal back up to the dequeuing mechanism 205 in L2, which then dequeues one or more packets in order of priority from the higher priority queue Q1 to the lower priority queue Qn.

Preferably, to increase the efficiency of the mechanism, only the minimum amount of data shall be transferred to the Access Stratum at each Transmission Time Interval (TTI). When L1 can transmit data again, L2 dequeues the minimum number of packets, from the higher priority queue to the lower queue, that can be transmitted at this time.

That is to say, there are preferably two rules for dequeuing packets from the L2 sorting queues 204 to the L1 transmission queue 206, as follows.

(i) L1 should be fed enough in order to transmit the maximum number of data per TTI according to the current bandwidth.

(ii) If the next packet (Next) to be dequeued cannot be transmitted within the next TTI (because the L1 transmission queue is full), then the dequeuing process should stop for the current TTI. If a new packet (New) from the upper sub-layer with higher priority than (Next) is queued in L2 within the next TTI, it can then be dequeued to L1 before (Next) for the next TTI. Dequeuing the maximum number of packets from L2 to L1, on the other hand, would be less preferable since it would mean dequeuing all packets available in one TTI and thus undermining the priority action in relation to any packets available in the next TTI.

Therefore the mechanism should preferably dequeue the minimum number of packets that makes L1 use its full bandwidth for that TTI.

Furthermore, embodiments of the present invention preferably provide another method to avoid packets being blocked because of their low priority levels. This is achieved by configuring the dequeuing mechanism 205 to dequeue one or more oldest packets regardless of priority level after some time period has elapsed, preferably doing so periodically. Yet more preferably, the oldest packet from every FIFO is periodically dequeued (perhaps with the exception of the highest priority queue which would never suffer from being blocked). For example, at a time period that is computed from the average packet size and the L1 bandwidth, the oldest packet of each queue is dequeued by the dequeuing mechanism 205 in L2 and forwarded to the transmission buffer 206 in L1.

The value of the dequeuing period of a FIFO will influence how much a FIFO is prioritised. E.g. setting a value of zero would remove the priority action, and setting it to infinite would remove the non-blocking guarantee.

Also, the value of the dequeuing period can preferably be modified dynamically to allow adaption to the transport rate and to the types of data being conveyed.

FIGS. 3*a*-3*d* provide a sequence of running time diagrams schematically illustrating the queuing and transmission of a plurality of different types of packet, corresponding to the packet shown queued in FIG. 2.

Figure 3A:
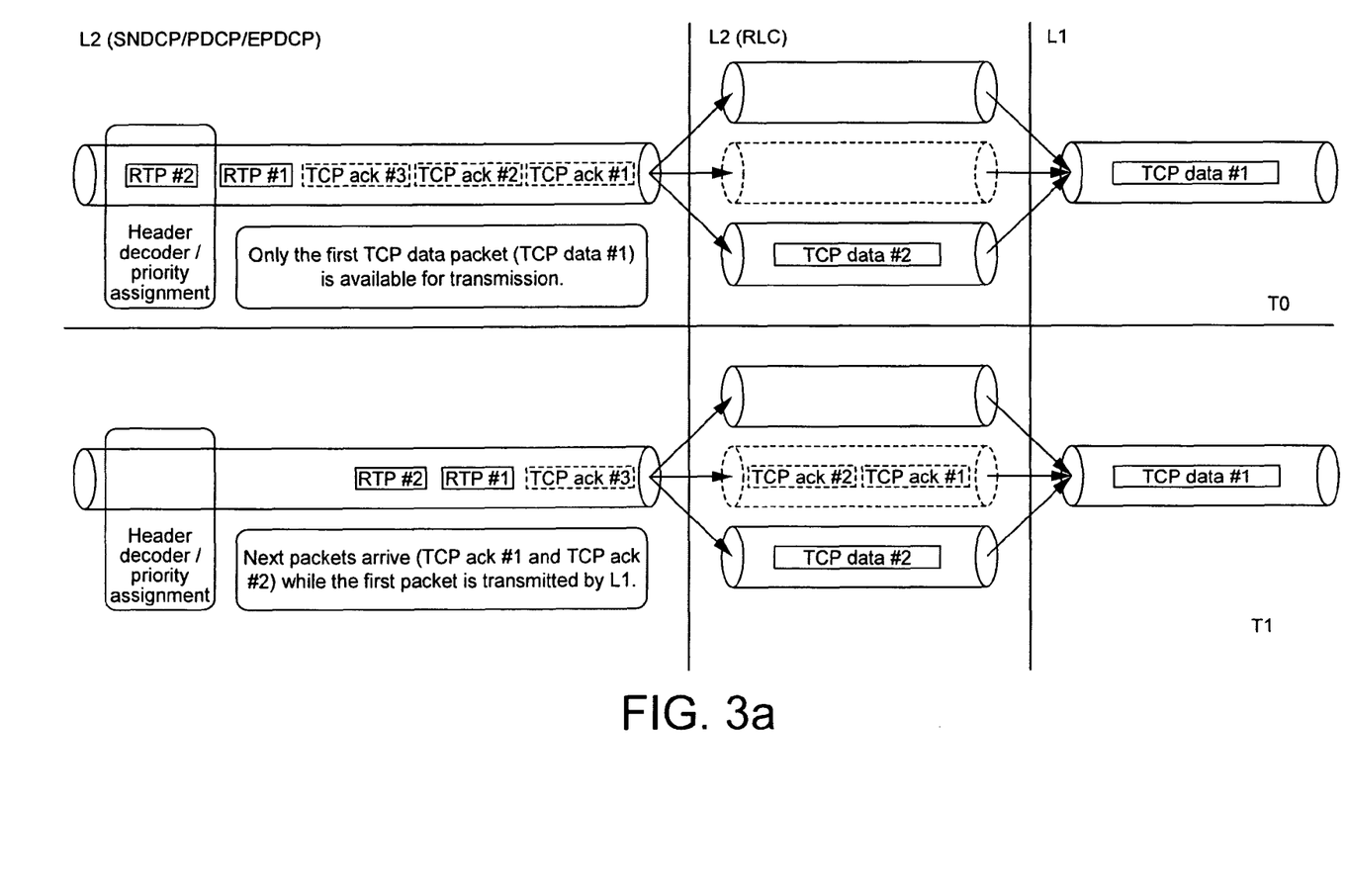
FIGS. 3a-3d are a sequence of running time diagrams schematically illustrating the queuing and transmission of a plurality of different types of packet.

At time T0, only the first TCP data packets (TCP data #1) is available for transmission. TCP data #1 is dequeued straight into to the transmission buffer and the second packet TCP data #2 is placed in the lowest priority sorting queue.

At time T1, the next packets arrive (TCP ack #1 and TCP ack #2) and are placed in the medium priority sorting queue while the first packet is transmitted by L1.

Figure 3B:
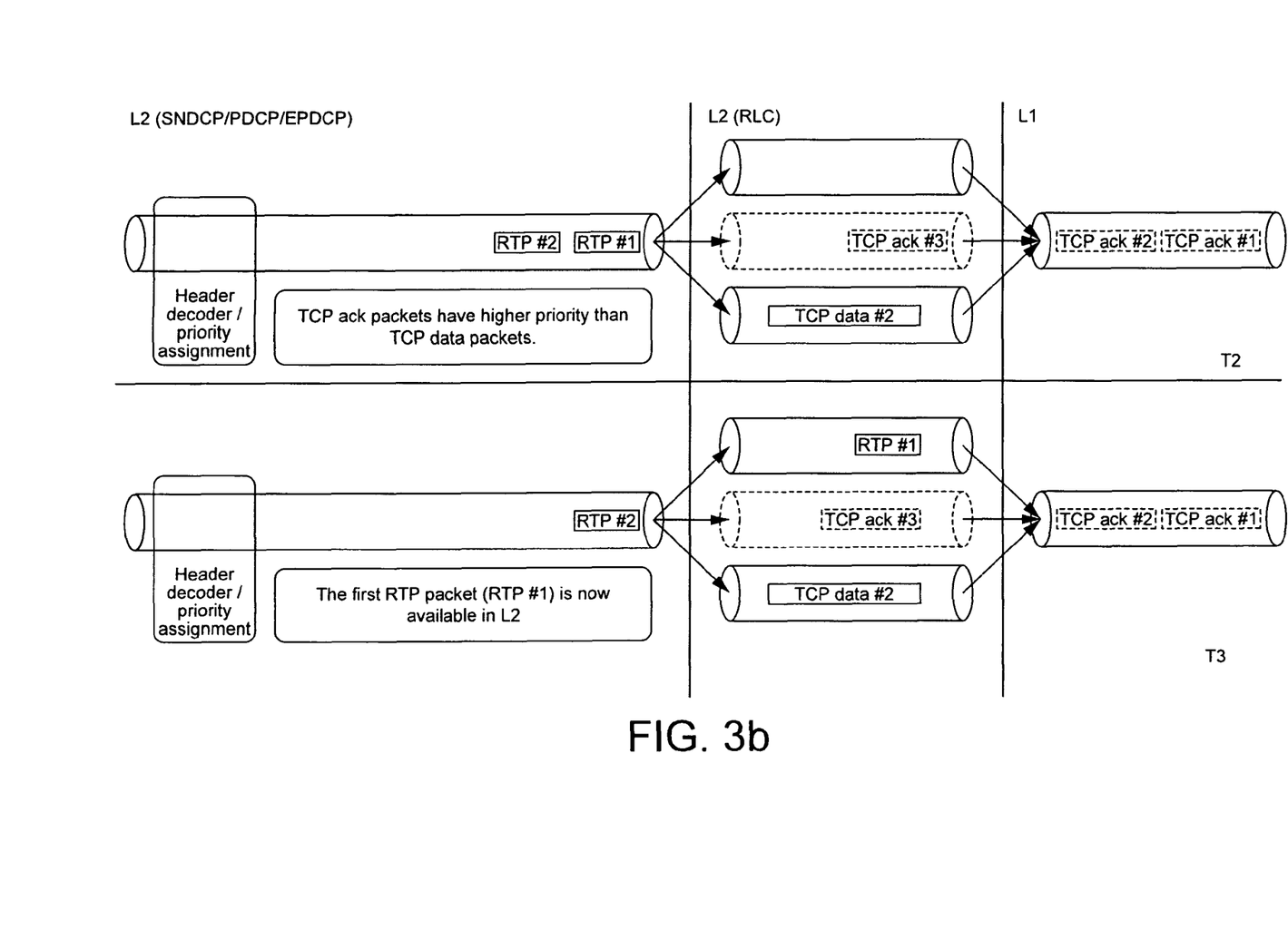

At time T2, the packets TCP ack #1 and TCP ack #2 are dequeued to the transmission buffer ahead of TCP data #2, even though it arrived first, because TCP ack packets are given a higher priority than TCP data packets.

At time T3, the first RTP packet (RTP #1) becomes available and is placed in the highest priority sorting queue in L2. A third TCP ack packet (TCP ack #3) is also available and is placed in the medium priority sorting queue.

Figure 3C:
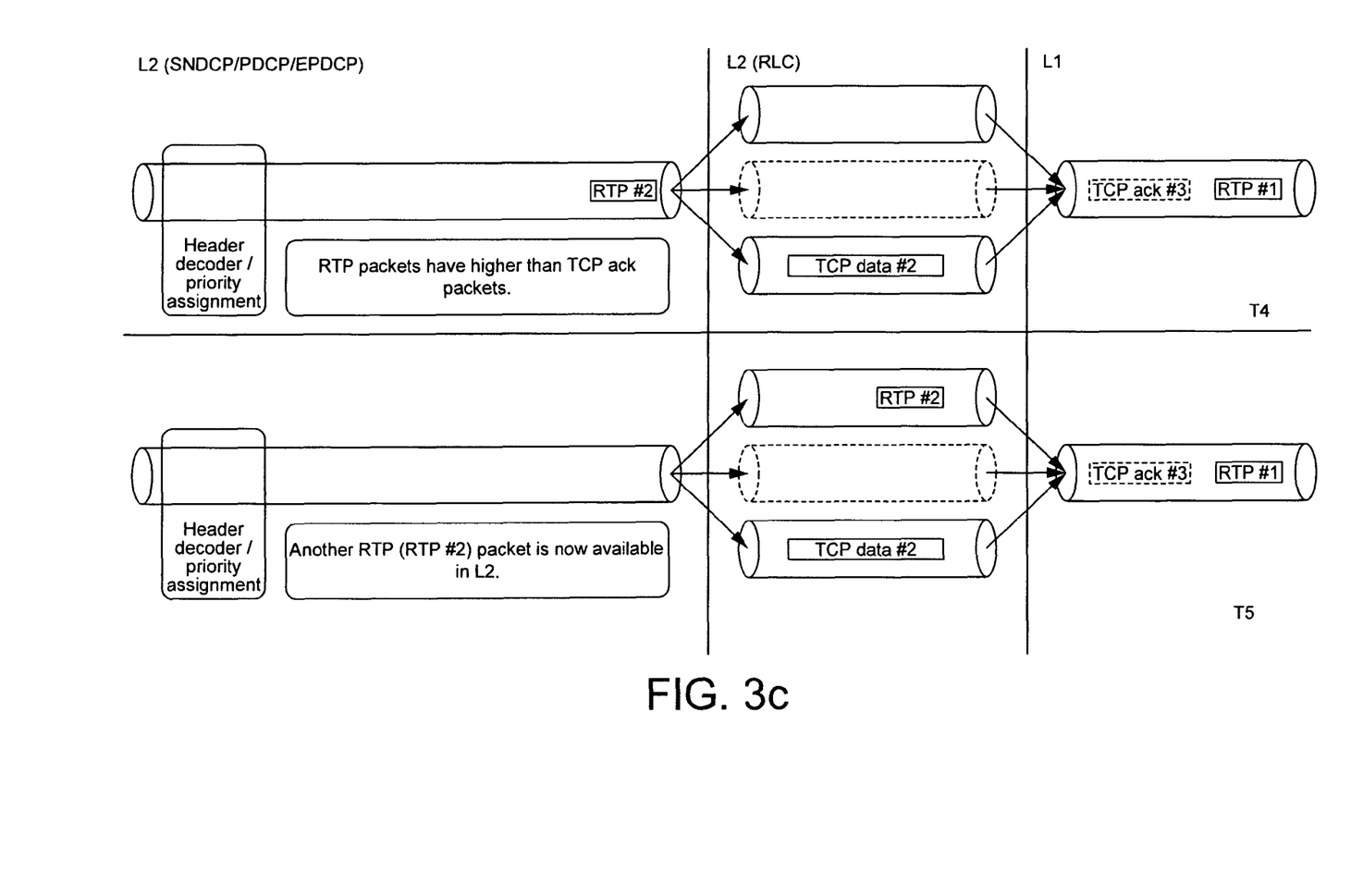

At time T4, the RTP #1 is dequeued to the transmission buffer in L1 ahead of TCP ack #3, which is dequeued afterwards, because RTP packets are given a higher priority than TCP packets.

At time T5, another RTP packet (RTP #2) becomes available and is placed in the highest priority sorting queue.

Figure 3D:
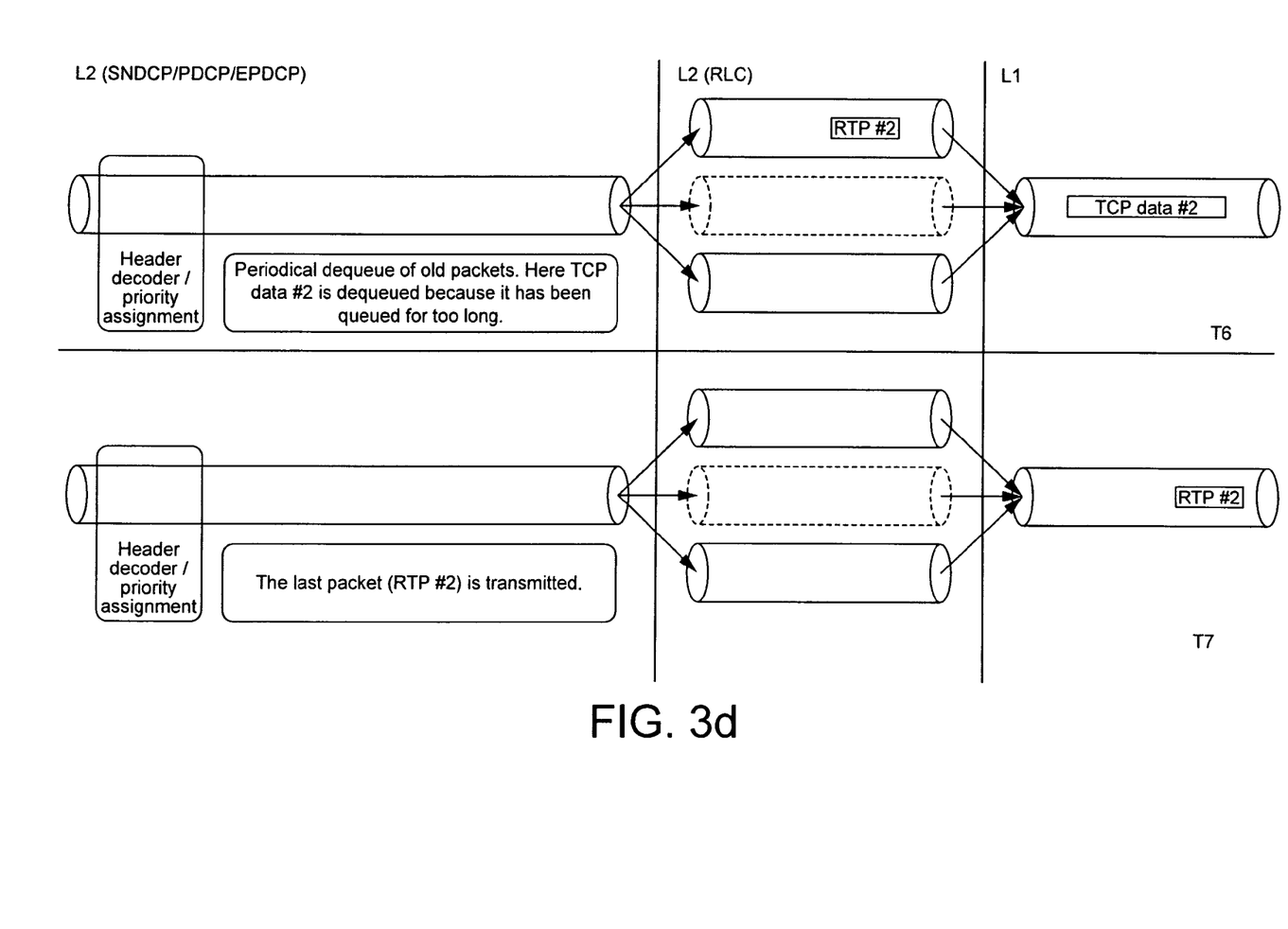

At time T6, TCP data #2 is dequeued into the transmission buffer in L1. It has a lower priority than RTP #2 which would otherwise have been dequeued before it, but in this example the periodic dequeuing period for the lowest priority sorting queue has expired and so TCP #2 is dequeued because it is too old and has been queued for too long. This advantageously prevents TCP #2 getting blocked.

At time T7, the last packet RTP #2 is dequeued to the transmit buffer.

Figure 4A:
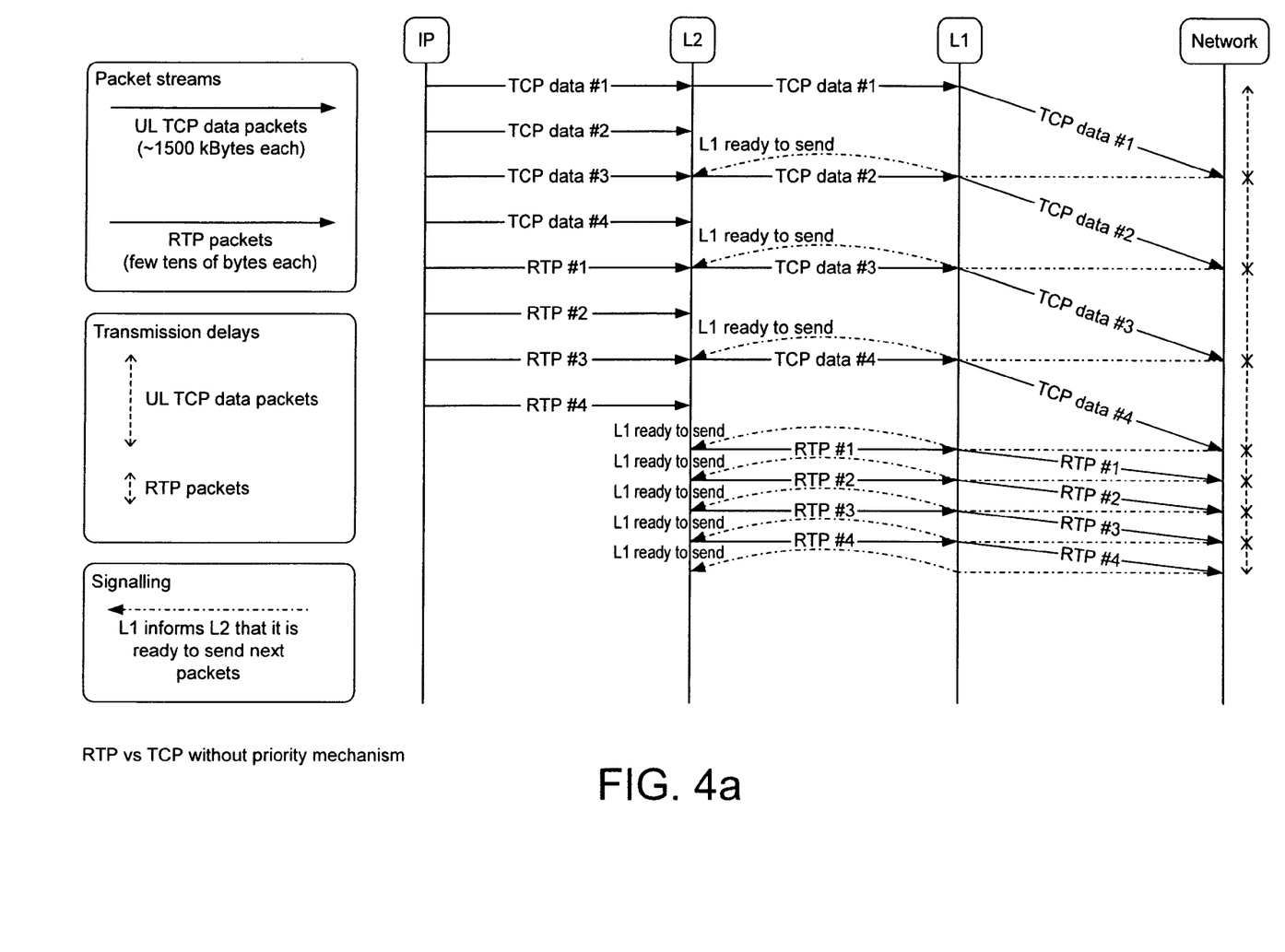
FIGS. 4a-4d are signalling charts showing the latency of transmission of different packet types with and without an example priority mechanism according to the present invention.
Figure 4B:
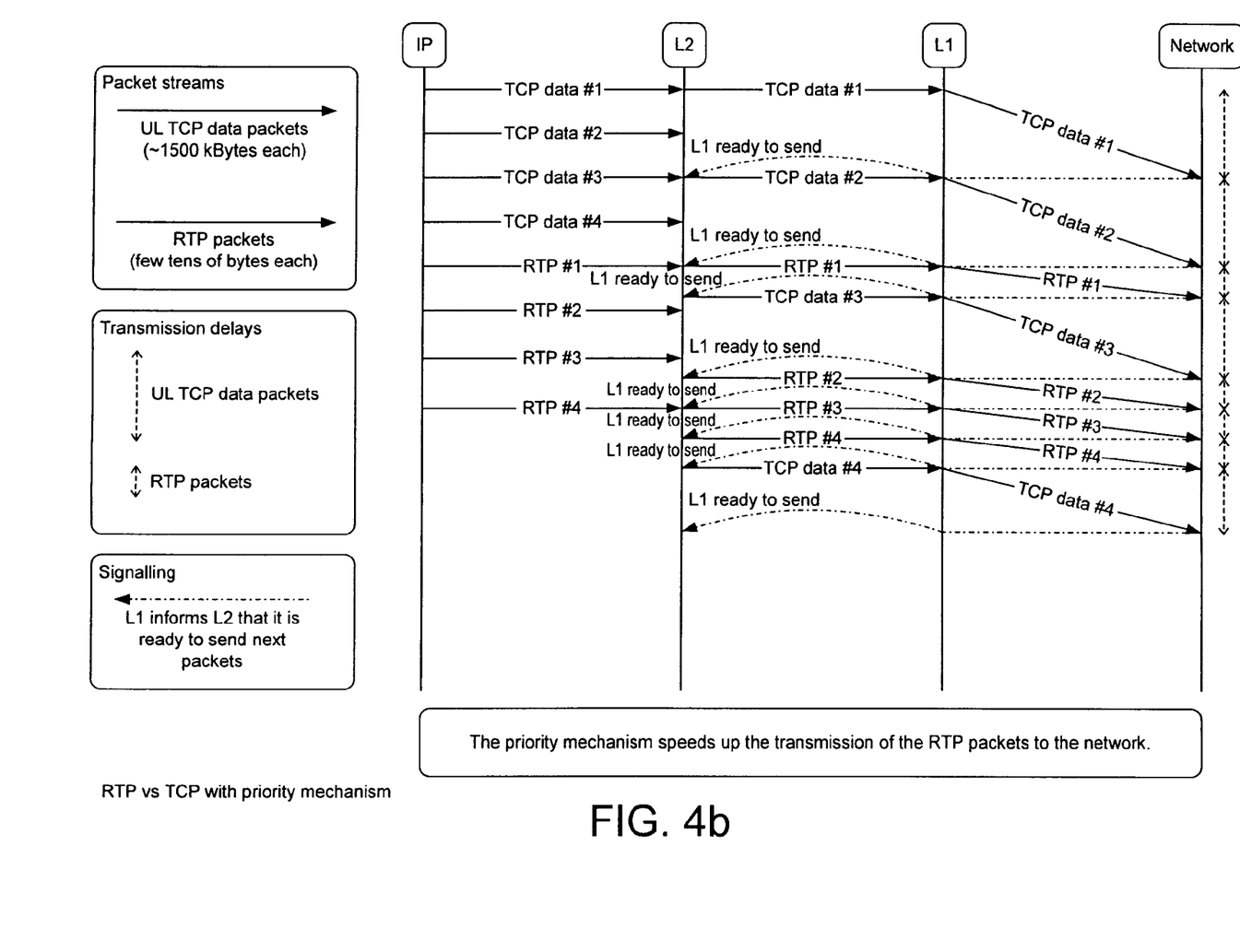
Figure 4C:
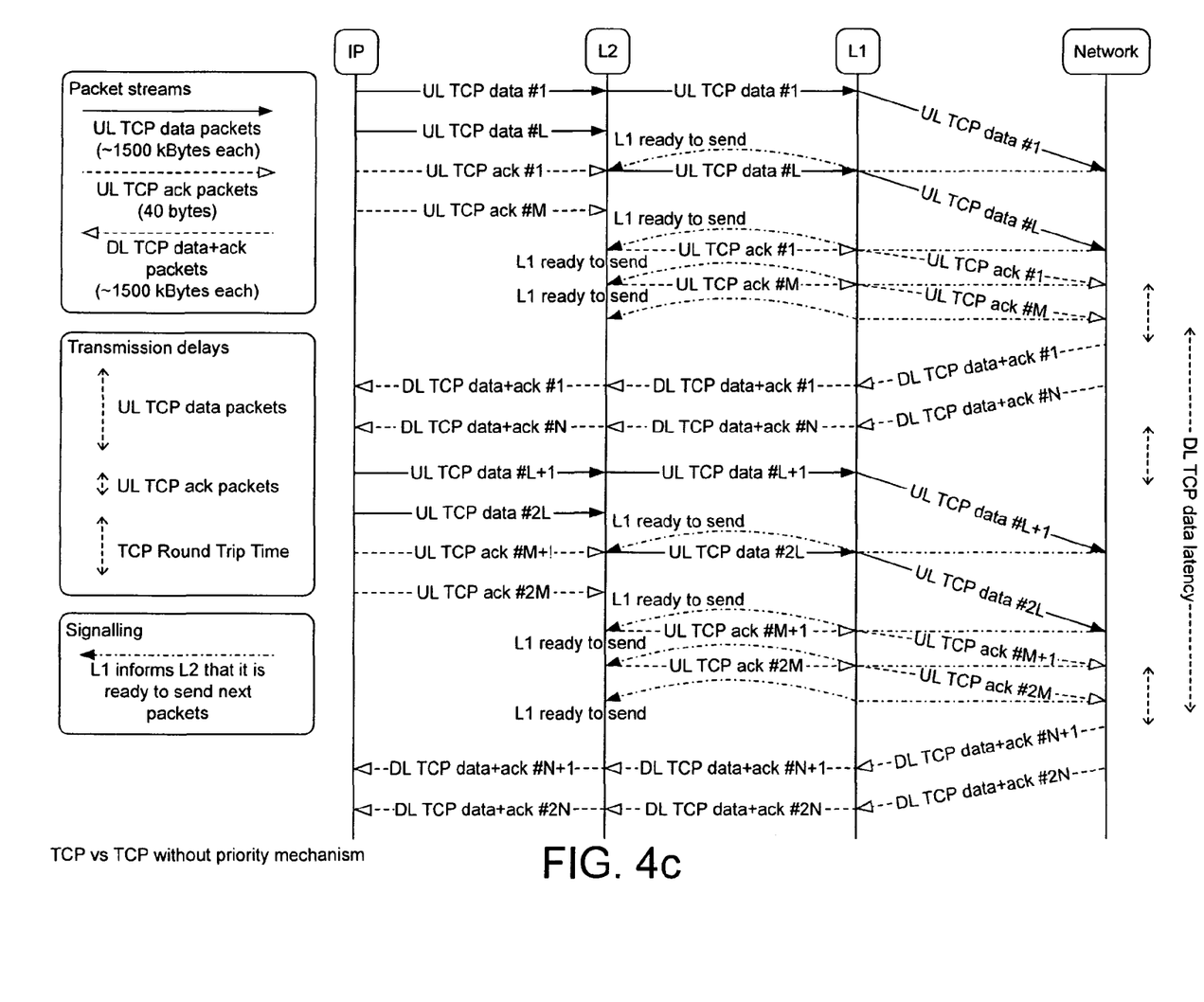
Figure 4D:
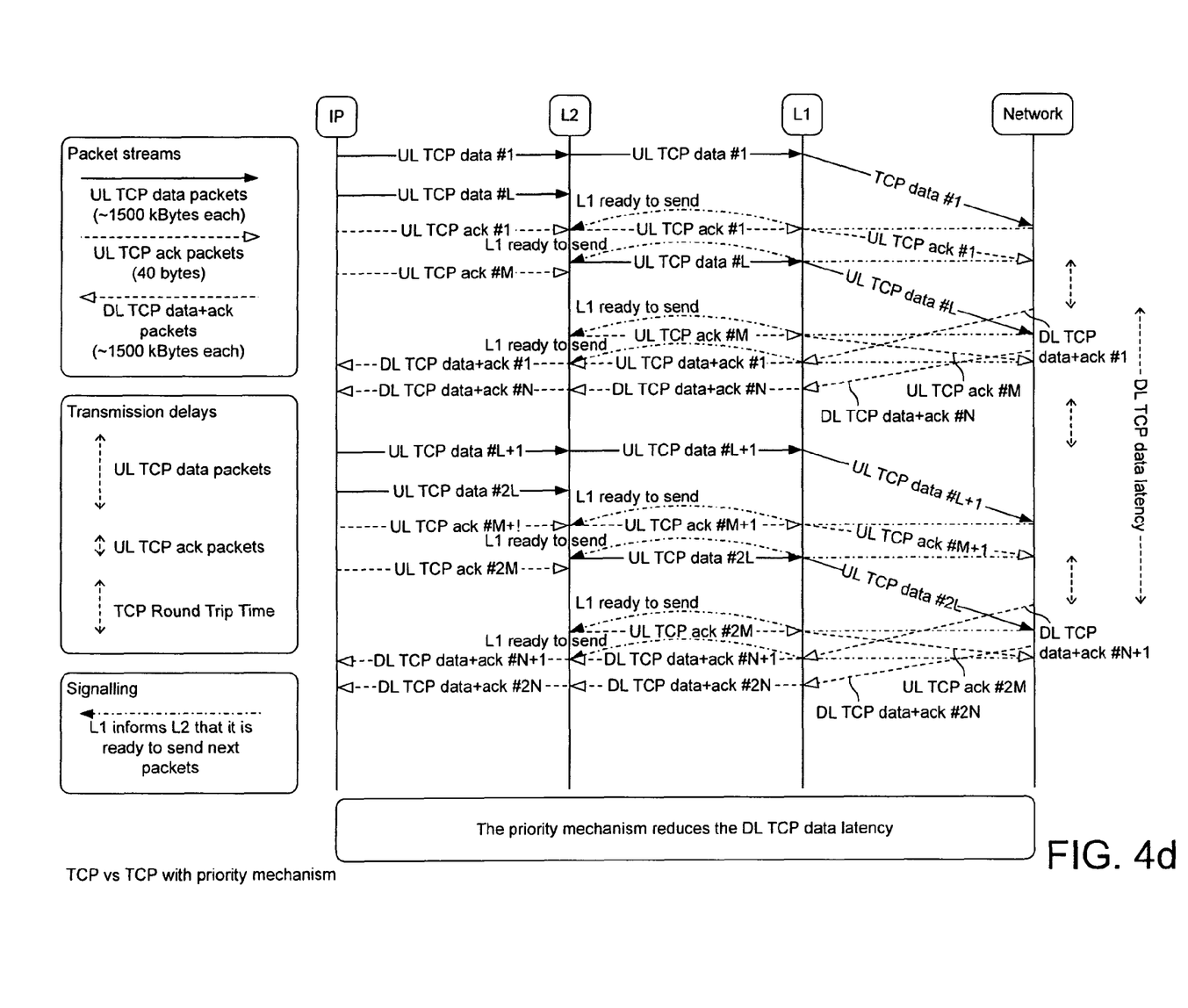

As an illustration of the potential efficacy of the present invention, FIG. 4*a* gives a signalling chart showing the latency in transmission of RTP and TCP packets without the priority mechanism described above, and FIG. 4*b* gives a signalling chart showing the latency in transmission of RTP and TCP packets with the priority mechanism described above. FIG. 4*c* gives a signalling chart showing the latency of TCP data and ACK packets without the priority mechanism described above, and FIG. 4*d* gives a signalling chart showing the latency in transmission of TCP data and ACK packets with the priority mechanism.

It will be appreciated that the above embodiments have been described only by way of example. For instance, the invention is not limited to use with TCP, RTP or UDP. With appropriate decoding the present can be used with any kind of transport protocol. Further, the invention is not limited to use in a 3GPP network or in any particular protocol stack. More generally the invention is applicable in any situation where it would be desirable to provide a priority mechanism in the layers responsible for transmitting over a wireless cellular network, but based on the type of protocol used in the higher layers responsible for communicating over a packet-based network (e.g. the Internet). Further, the header decoder of the present invention need not necessarily be implemented in the RLC, but could be implemented in any suitable layer of the modem. Further, the invention is not limited by any particular manner of modelling the protocol stack. Other applications or configurations of the present invention may be apparent to a person skilled in the art given the disclosure herein. The scope of the invention is not limited by the described embodiments, but only by the appendant claims.

The invention claimed is:

1. A terminal comprising:
   a radio-frequency transmitter for transmitting packets on an uplink to a wireless cellular network; and
   processing apparatus comprising an upper protocol stack and a lower protocol stack coupled between the upper stack and the radio-frequency transmitter, the upper stack being arranged to process data according to one or more transport protocols and form the data into packets of a plurality of different types for transmission over a packet-based network, and the lower stack being arranged to receive said packets from the upper stack and process the packets for transmission via the wireless cellular network;
   wherein the lower stack comprises a plurality of packet queues each corresponding to a different respective priority level, and a packet decoder configured to decode a portion of each packet to determine its type and supply each packet in dependence on its type to a packet queue of a corresponding priority level; and
   wherein the lower stack further comprises a dequeuing mechanism configured to dequeue packets from said queues in dependence on the priority levels for transmission from the radio-frequency transmitter via the wireless cellular network to the packet-based network, wherein the dequeuing mechanism is configured, after a specified time period, to periodically dequeue one or more oldest packets regardless of priority level with a period that is dynamically variable.

2. The terminal of claim 1, wherein the dequeuing mechanism is configured to periodically dequeue the oldest packet from each of a plurality of said queues regardless of priority level.

3. The terminal of claim 1, wherein the dequeuing mechanism is configured to dequeue the one or more oldest packets with a period determined in dependence on one or both of: an average packet size, and a bandwidth of a transmission means to which said packets are dequeued for transmission.

4. The terminal of claim 1, wherein the upper stack is arranged to process data according to a plurality of different transport protocols, said different types corresponding to the different transport protocols.

5. The terminal of claim 4, wherein said different transport protocols include at least one or more of TCP, RTP and UDP.

6. The terminal of claim 5, wherein the packet decoder is configured to supply RTP packets to a higher priority queue than TCP packets.

7. The terminal of claim 1, wherein said different types correspond to whether or not the packet comprises an acknowledgement message of the transport protocol.

8. The terminal of claim 7, wherein the packet decoder is configured to supply TCP ACK packets to a higher priority queue than TCP data packets.

9. The terminal of claim 1, wherein the packet decoder is configured to determine the type of each packet by reading a header of the transport protocol in each packet.

10. The terminal of claim 1, wherein the lower stack is arranged to transmit in a plurality of transmission time intervals, and its dequeuing mechanism is configured to dequeue only a minimum amount of data per transmission time interval, the minimum amount corresponding to a bandwidth available for transmission in that time interval.

11. The terminal of claim 1, wherein the upper stack comprises a transport layer arranged to process the data according to the one or more transport protocols, and an IP layer configured to form portions of the data from the transport layer into IP packets for transmission over the packet-based network.

12. The terminal of claim 11, wherein the upper stack comprises at least one further layer above the transport layer configured to control a session of the packet-based network.

13. The terminal of claim 11, wherein said packets of different types are transmitted using a same session context.

14. The terminal of claim 1, wherein the packet-based network comprises the Internet.

15. The terminal of claim 1, wherein the lower stack comprises at least 3GPP Layer 2 and Layer 1.

16. The terminal of claim 15, wherein said plurality of packet queues and the dequeuing mechanism are each implemented in Layer 2, the dequeuing mechanism being configured to dequeue the packets from said queues to Layer 1 for transmission from the radio-frequency transmitter via the wireless cellular network to the packet-based network.

17. The terminal of claim 15, wherein Layer 2 includes a header decoder implemented therein.

18. The terminal of claim 1, wherein the wireless cellular network comprises a 3GPP network.

19. A method comprising:
in an upper protocol stack, processing data according to one or more transport protocols and forming the data into packets of a plurality of different types for transmission over a packet-based network;
in a lower protocol stack, receiving said packets from the upper stack and processing the packets for transmission via a wireless cellular network;
operating a radio-frequency transmitter to transmit said packets on an uplink to the wireless cellular network;
wherein the method further comprises, in the lower stack, decoding a portion of each of said packets to determine its type, and supplying each packet in dependence on its type to a packet queue of a corresponding priority level; and
dequeuing packets from said queues in dependence on the priority levels, for transmission from the radio-frequency transmitter via the wireless cellular network to the packet-based network, wherein the dequeuing mechanism is configured, after a specified time period, to periodically dequeue one or more oldest packets regardless of priority level with a period determined in dependence on one or both of: an average packet size, and a bandwidth of a transmission means to which said packets are dequeued for transmission.

20. A lower protocol stack program product for use in conjunction with an upper protocol stack; the upper protocol stack being for processing data according to one or more transport protocols and forming the data into packets of a plurality of different types for transmission over a packet-based network; and the lower protocol stack program product comprising code embodied on a non-transitory computer readable medium and being configured so as when executed on a processor to:
receive said packets from the upper stack, and process the packets for transmission via a wireless cellular network;
decode a portion of each of said packets to determine its type, and supply each packet in dependence on its type to a packet queue of a corresponding priority level;
dequeue packets from said queues in dependence on the priority levels, for transmission from the radio-frequency transmitter via the wireless cellular network to the packet-based network, wherein the dequeuing mechanism is configured, after a specified time period, to periodically dequeue one or more oldest packets regardless of priority level with a period that is dynamically variable; and
operate a radio-frequency transmitter to transmit the dequeued packets on an uplink to the wireless cellular network.

* * * * *